J. McCORMICK.
HARNESS-CLAMPS.
No. 178,072.  Patented May 30, 1876.
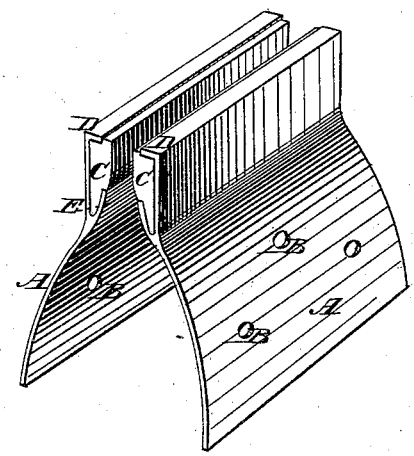
WITNESSES:
Francis McArdle,
John Goethals
INVENTOR:
J. McCormick
BY
ATTORNEYS.

UNITED STATES PATENT OFFICE.

JAMES McCORMICK, OF GLIDDEN, IOWA.

IMPROVEMENT IN HARNESS-CLAMPS.

Specification forming part of Letters Patent No. 178,072, dated May 30, 1876; application filed April 10, 1876.

*To all whom it may concern:*

Be it known that I, JAMES McCORMICK, of Glidden, Carroll county, Iowa, have invented a new and Improved Harness-Clamp, of which the following is a specification:

My invention consists of rubber-faced metal plates for attachment to the jaws of harness-makers' sewing-clamps, to hold the leather to be sewed without injury to it, and at the same time hold it firmly, the said plates being constructed with a groove in the face side, which receives the rubber facing, and holds it securely without rivets or other fastenings.

The drawing is a perspective view of my improved jaw-plates.

A represents the jaw-plates, which are made of thin sheet metal, to attach to the inner sides of the jaws of the clamp by rivets or screws through holes B. C represents the rubber facing to the plates, which are secured by the flanges D E, the flange D being turned over at the top, and E being a strip soldered or brazed onto the inside of the plates.

I am aware that it is not new to provide the jaws of a leather-crimping machine with elastic faces; but in said instance strips of rubber are directly attached to the jaws, and not to a plate provided with means for retaining the rubber or elastic face, and adapted to be attached to the jaws of a harness-clamp.

Having thus described my invention, I claim as new and desire to secure by Letters Patent—

The combination of the attachable plates A, provided with the flanges D E, with the rubber or elastic facing-plates C, as and for the purpose set forth.

JAMES McCORMICK.

Witnesses:
 M. W. BEACH,
 THOMAS ELWOOD.